US012698043B2

(12) United States Patent (10) Patent No.: US 12,698,043 B2
Hermann (45) Date of Patent: Aug. 4, 2026

(54) VEHICLE COMPRISING AN AIR DEFLECTOR PANEL AND A METHOD FOR OPTIMIZING THE POSITION OF THE AIR DEFLECTOR PANEL

(71) Applicant: Volvo Truck Corporation, Gothenburg (SE)

(72) Inventor: Olivier Hermann, Saint-Maurice-sur-Dargoire (FR)

(73) Assignee: Volvo Truck Corporation, Gothenburg (SE)

( * ) Notice: Subject to any disclaimer, the term of this patent is extended or adjusted under 35 U.S.C. 154(b) by 362 days.

(21) Appl. No.: 18/480,636

(22) Filed: Oct. 4, 2023

(65) Prior Publication Data

US 2024/0116579 A1 Apr. 11, 2024

(30) Foreign Application Priority Data

Oct. 11, 2022 (EP) ..................................... 22200821

(51) Int. Cl.
| | |
|---|---|
| *B62D 35/00* | (2006.01) |
| *B60Q 1/00* | (2006.01) |
| *B62D 37/02* | (2006.01) |

(52) U.S. Cl.
CPC ......... *B62D 35/001* (2013.01); *B60Q 1/0023* (2013.01); *B62D 37/02* (2013.01)

(58) Field of Classification Search
CPC .... B62D 35/001; B62D 37/02; B60Q 1/0023; B60R 2300/103

(Continued)

(56) References Cited

U.S. PATENT DOCUMENTS

| | | | | |
|---|---|---|---|---|
| 10,793,055 B1 * | 10/2020 | Berne | .................. | B62D 35/008 |
| 11,780,511 B2 * | 10/2023 | Wang | .......................... | B60J 1/20 |
| | | | | 296/180.5 |

(Continued)

FOREIGN PATENT DOCUMENTS

| | | |
|---|---|---|
| CN | 111516765 A | 8/2020 |
| DE | 102008056357 A1 | 5/2010 |

(Continued)

OTHER PUBLICATIONS

UN Regulation No. 46—rev. 6—amend. 8 | unece. (2022). https://unece.org/transport/documents/2022/11/standards/un-regulation-no-46-rev-6-amend-8 (Year: 2022).*

(Continued)

*Primary Examiner* — Erin D Bishop
*Assistant Examiner* — Keith A von Volkenburg
(74) *Attorney, Agent, or Firm* — Withrow & Terranova, PLLC

(57) ABSTRACT

A vehicle comprising a camera monitoring system, which includes a camera arranged on supporting arm mounted on a cab, to provide captured image of area located rearward of cab; at least one lighting device which is mounted on an air deflector panel and which is configured to form a mark on a load or the trailer, the mark being positioned to be at least partially detectable by the camera and the mark depending on the current position of the air deflector panel; and a controller configured to determine the current position of the air deflector panel relative to an optimal position thereof by comparing the mark at least partially detected by the camera with a reference mark corresponding to the optimal position of the air deflector panel and configured to control an actuator to adjust the position of the air deflector panel from its current position to its optimal position.

15 Claims, 3 Drawing Sheets

(58) Field of Classification Search
USPC ........................................................... 701/49
See application file for complete search history.

(56)                          References Cited

U.S. PATENT DOCUMENTS

| | | | | |
|---|---|---|---|---|
| 2005/0173945 | A1 | 8/2005 | Frank et al. | |
| 2005/0281042 | A1* | 12/2005 | Kawai ................. | B62D 35/001 |
| | | | | 362/493 |
| 2018/0111648 | A1 | 4/2018 | Amar | |
| 2019/0172218 | A1* | 6/2019 | Maruoka .................. | G06T 7/20 |
| 2020/0156712 | A1* | 5/2020 | Hermann .............. | B62D 25/02 |
| 2020/0307440 | A1 | 10/2020 | Berne et al. | |
| 2022/0258812 | A1* | 8/2022 | Tenstam ................. | B62D 37/02 |

FOREIGN PATENT DOCUMENTS

| | | | | |
|---|---|---|---|---|
| DE | 102012023577 A1 | 6/2014 | | |
| DE | 102014018850 A1 | 6/2015 | | |
| DE | 102019007568 A1 | 5/2021 | | |
| EP | 2792579 A1 | 10/2014 | | |
| NL | 2024389 B1 * | 8/2021 | ........... | B62D 35/001 |
| SE | 1951200 A1 | 4/2021 | | |
| WO | 2020192885 A1 | 10/2020 | | |
| WO | 2021078858 A1 | 4/2021 | | |
| WO | 2021083706 A1 | 5/2021 | | |

OTHER PUBLICATIONS

European Search Report for European Patent Application No.
22200821.1, completed Mar. 3, 2023, 3 pages.

* cited by examiner

100

102 — Forming a mark on the load or trailer

104 — At least partially detecting the mark

106 — Determining the current position of
the air deflector panel relative to
an optimal position thereof 108 — Adjusting the position of
the air deflector panel

VEHICLE COMPRISING AN AIR DEFLECTOR PANEL AND A METHOD FOR OPTIMIZING THE POSITION OF THE AIR DEFLECTOR PANEL

RELATED APPLICATIONS

The present application claims priority to European Patent Application No. 22200821.1, filed on Oct. 11, 2022, and entitled "VEHICLE COMPRISING AN AIR DEFLECTOR PANEL AND A METHOD FOR OPTIMIZING THE POSITION OF THE AIR DEFLECTOR PANEL," which is incorporated herein by reference in its entirety.

TECHNICAL FIELD

The disclosure relates generally to a vehicle comprising an air deflector panel and a method for optimizing the position of the air deflector panel.

The disclosure can be applied in vehicles including a cab and carrying a load or towing a trailer, in particular in heavy-duty vehicles, such as trucks, buses, and construction equipment. Although the disclosure may be described with respect to a particular vehicle, the disclosure is not restricted to any particular vehicle.

BACKGROUND

Air resistance of a vehicle, particularly of a truck or a truck-trailer combination, is one of the important factors influencing fuel consumption of the vehicle, when driving at highway speed. Especially, trucks or truck-trailer combinations, where height and/or width of the driver's cab and the storage compartment or trailer differ, show a large air resistance during driving.

A common measure to reduce the air resistance of a truck or truck-trailer combination is to use air deflectors, which hide the frontal face area of the trailer from an oncoming air flow to get a more streamlined complete vehicle. Usually, there is at least one roof air deflector mounted to the roof of the driver's cab, which levels out the height difference between tractor and trailer and guides air over the vehicle. Additionally, the truck may comprise side air deflectors which are mounted to the sides of the driver's cab and guide air sideways along the vehicle.

The settings, i.e., the angular position, of the air deflectors have a significant effect on the total vehicle air resistance even for small angular variations. Therefore, careful optimization of the settings is required for reducing the fuel consumption.

Currently, most trucks are equipped with tabular data for setting the air deflectors with respect to truck height, trailer height and distance between tractor and trailer. The tabular data are provided e.g., by the truck manufacturer as a manual table or can be stored in a memory. It is then up to the driver to manually adjust the deflectors according to the complete vehicle setup. Disadvantageously, the driver often neglects to adjust the air deflectors so that the air deflectors are not or wrongly adjusted, which in turn increases the driving cost, significantly.

It has therefore been suggested in the state of the art, e.g., in the Patent Application US 2005/0173945, to store the air deflector settings in a memory and to interrogate the geometrical data of truck and trailer from the driver by a human machine interface. Thereby, the method ensures that a driver does not neglect the adjustment of the air deflectors. As soon as the geometrical data are identified, the method reads out the corresponding setting for the air deflectors from the tabular stored in the memory and adjusts the air deflectors in accordance. The settings are predetermined for a plurality of different truck-trailer combination possibilities.

However, one major disadvantage of this system is the interrogation procedure or the manual adjustment of the air deflectors, especially, if the driver interrogation procedure takes place during driving, the driver being distracted from his primary driving tasks, which interferes with safety aspects.

SUMMARY

An object of the invention is to provide a vehicle comprising an air deflector panel and a method for optimizing the position of the air deflector that alleviate the mentioned drawbacks of the prior art.

According to a first aspect of the invention, the object is achieved by a vehicle comprising:

- a chassis which has a longitudinal axis and which is supported by wheels;
- a cab mounted on the chassis;
- a load or a trailer detachably attached to the chassis;
- an air deflector panel, which is movably attached to the cab;
- an actuator configured to adjust the position of the air deflector panel relative to the cab;
- a camera monitoring system, which includes a camera arranged on a supporting arm mounted on the cab, to provide a captured image of an area located rearward of the cab;
- at least one lighting device which is mounted on the air deflector panel and which is configured to form a mark on the load or the trailer, the mark being positioned to be at least partially detectable by the camera and the mark depending on the current position of the air deflector panel;
- a controller configured to determine the current position of the air deflector panel relative to an optimal position thereof by comparing the mark at least partially detected by the camera with a reference mark corresponding to the optimal position of the air deflector panel and configured to control the actuator to adjust the position of the air deflector panel from its current position to its optimal position.

Thus configured, the vehicle of the present invention permits to determine the current position of the air deflector panel relative to an optimal position thereof by detecting a mark formed on a load carried by the vehicle or a trailer towed by the vehicle, the mark depending on the position of the air deflector panel. By comparing this detected mark with a reference mark corresponding to an optimal position of the air deflector panel, the controller can control the actuator to adjust the position of the air deflector panel from its current position to its optimal position.

According to one embodiment, the mark consists of a set of horizontal lines and the controller is configured to determine the current position of the air deflector panel relative to its optimal position based on a number of horizontal lines of which the mark is formed.

According to a further embodiment, the controller is configured to compare the number of horizontal lines of the mark with a reference number corresponding to the number of horizontal lines of the reference mark and to control the actuator based on said comparison.

According to a further embodiment, the controller is configured to control the actuator to upward the air deflector panel if the number of horizontal lines of the mark is greater than the reference number and to downward the air deflector panel if the number of horizontal lines of the mark is lower than the reference number.

According to a further embodiment, the camera monitoring system is adapted to count the horizontal lines in the captured image.

According to a further embodiment, the camera is adapted to provide a class II or IV field of vision as defined in the Regulation UN ECE no. 46.

According to a further embodiment, the air deflector panel has a front edge pivotally linked to a roof of the cab and a rear edge.

According to a further embodiment, the at least one lighting device is mounted near the rear edge of the air deflector panel.

According to a second aspect of the invention, the object is achieved by a method for controlling the position of an air deflector panel movably attached to a cab of a vehicle, the vehicle carrying a load or towing a trailer, the method comprising the steps of:

forming a mark on the load or the trailer, using at least one lighting device which is mounted on the air deflector panel, at least partially detecting the mark using a camera arranged on a supporting arm mounted on the cab, determining the current position of the air deflector panel relative to an optimal position thereof by comparing the mark at least partially detected by the camera with a reference mark corresponding to the optimal position of the air deflector panel, adjusting the position of the air deflector panel from its current position to its optimal position using an actuator.

According to one embodiment, the mark consisting of a set of horizontal lines, the determination of the current position of the air deflector panel relative to its optimal position is based on a number of horizontal lines of which the mark is formed.

According to a further embodiment, the determination of the current position of the air deflector panel relative to its optimal position involves a comparison between the number of horizontal lines of the mark with a reference number corresponding to the number of horizontal lines of the reference mark and the step of adjusting the position of the air deflector panel consists in upwarding the air deflector panel if the number of horizontal lines of the mark is greater than the reference number and downwarding the air deflector panel if the number of horizontal lines of the mark is lower than the reference number.

According to a further embodiment, the step of detecting the mark involves a count of the horizontal lines of the mark.

According to a further embodiment, the camera is adapted to provide a class II or IV field of vision as defined in the Regulation UN ECE no. 46.

According to a further embodiment, the air deflector panel has a front edge pivotally linked to a roof of the cab and a rear edge.

According to a further embodiment, the at least one lighting device is mounted near the rear edge of the air deflector panel.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
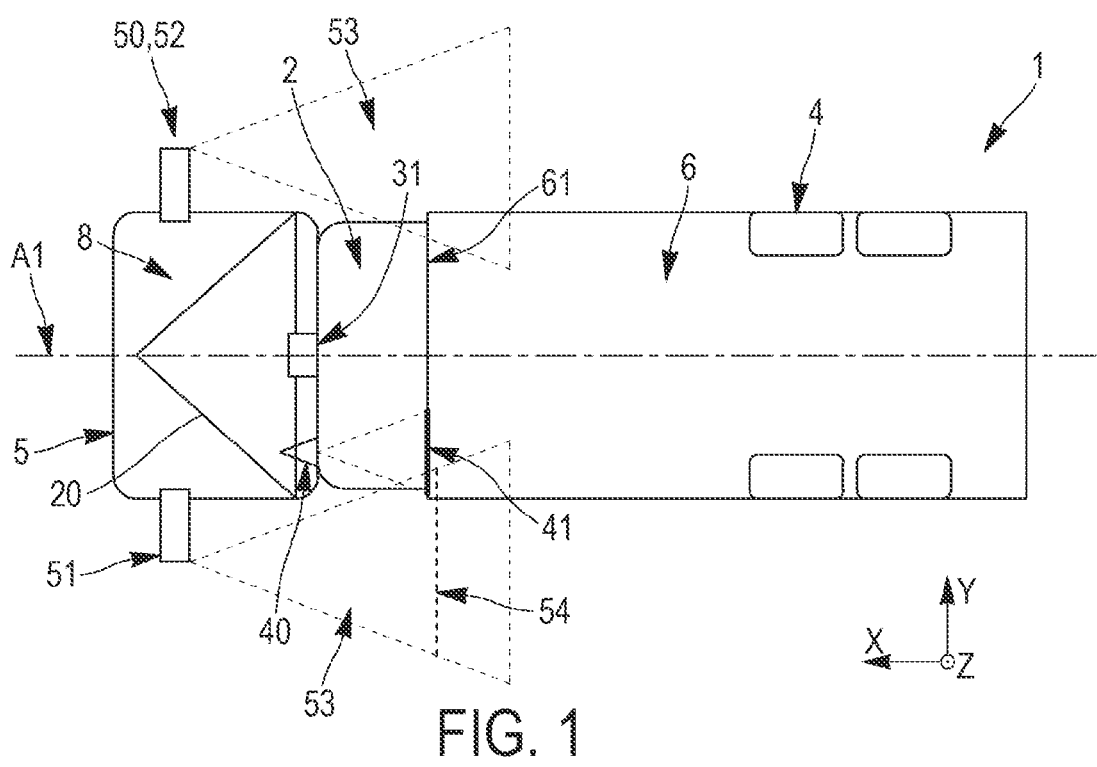
FIG. 1 is a schematic top view of a vehicle according to an embodiment of the invention.
Figure 2:
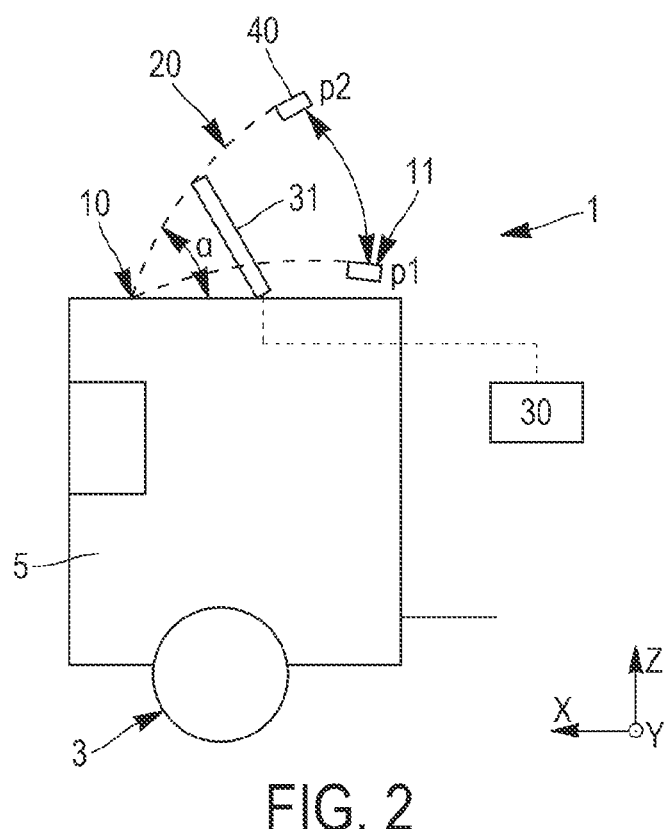
FIG. 2 is a schematic side view of the cab of the vehicle of FIG. 1.

A vehicle 1, i.e., a truck as illustrated in FIGS. 1 and 2, comprises a chassis 2 supported by front and rear wheels 3. A cab 5 defining a driver's compartment is mounted on the chassis 2, on the front. The chassis 2 can include a trailer connector (not shown) located rearward of the cab 5. The vehicle 1 can thus include a trailer 6 mechanically and electrically connected to the chassis 2, or no trailer connected to the chassis 2, the vehicle 1 thus carrying a load. The trailer 11 comprises rear wheels 4. The trailer 6 can be pivotally connected to the chassis 2.

Z is defined as the vertical direction, X is defined as the longitudinal direction of the vehicle 1 and Y is defined as the transverse direction of the vehicle 1. The chassis 2 has a longitudinal axis A1 and the trailer 6 will advantageously have the same longitudinal axis A1 when the method of the present invention is applied.

The vehicle 1 may comprise a controller 30 for controlling the various electric systems of the vehicle 1.

The vehicle 1 also comprises a wind deflecting assembly for improving aerodynamics. The wind deflecting assembly comprises a top air deflector panel 20 arranged on the roof 8 of the cab 5, and can further comprise two side deflector panels (not shown).

The top air deflector 20 comprises a major essentially planar air-deflecting surface, which has a front edge 10 and a rear edge 11 essentially opposite the front edge 10. When arranged on the cab 5, the top air deflector panel 20 is arranged to be pivotable around its front edge 10 to form an angle of inclination a relative to the roof 8 of the cab 5. The top air deflector panel 20 may be mounted by means of a frame (not shown) to the cab 5 and the top air deflector panel 20 may be moveable with respect to the frame.

As illustrated in FIG. 2, the angular position of the top air deflector panel 20 may be adjusted by an actuator 31 which is in communication with the controller 30. The actuator 31 may be any type of actuator that is capable of setting the position/orientation of the top air deflector panel 20 such as a linearly operating actuator or an angularly operating actuator. For example, the actuator 31 may be an electrically driven actuator. The controller 30 is thus adapted to change the current supplied to the driven actuator to adjust the position/orientation of the top air deflector panel 20, in particular the angle of inclination a relative to the roof 8 of the cab 5.

The top air deflector panel 20 may for instance be moved from a lowest position p1, in which the angle of inclination a is for example between 0°-15°, towards a highest position p2, in which the angle of inclination a is for example between 20°-60°, by means of the actuator 31.

The vehicle 1 further comprises a camera monitoring system 50 (or CMS). The camera monitoring system 50 includes a camera 51 arranged on a supporting arm mounted on the cab 5, preferably a left camera 51 and a right camera 52. Each camera 51, 52 can typically be mounted on a front upper side portion of the cab 5, for example above a door.

Each camera 51, 52 is adapted to provide a captured image 54 of an area located rearward of the cab 5, and preferably along the corresponding side of the vehicle 1.

The supporting arms can be fixedly mounted on the cab 5, and can be equipped with a mechanism (not represented) allowing the cameras 51, 52 to be:

either in an inactive position (not represented in the Figures), when not in use (typically when the vehicle 1 is stopped), in which the cameras 51, 52 are folded down along the corresponding side wall of the cab 5, to prevent it from being damaged;

or in an active position, in which the cameras 51, 52 protrude from the corresponding side wall of the cab 5, to allow them to capture images (see FIG. 1 for example). In this active position, each camera 51, 52 has a field of vision 53. This field of vision 53 may preferably correspond to a class II or IV field of vision as defined in the Regulation UN ECE n° 46.

The camera monitoring system 50 may further comprise a screen (not shown) inside the passenger compartment of the cab 5, for displaying an image obtained from the captured image 44 provided by the camera 53.

The camera monitoring system 50 also preferably comprises a control unit (not shown), which can be connected to the controller 30 of the vehicle 1.

The vehicle 1 also comprises at least one lighting device 40 which is mounted on the top air deflector panel 20.

The lighting device 40 can comprise a housing which receives light sources that emit a beam rearward through a glass. All or some light sources can comprise LEDs. The lighting device 30 may include other components such as an optical deflector.

As illustrated in FIG. 2, the lighting device 40 can be mounted near the rear edge 11 of the side deflector panel 20.

The lighting device 40 is adapted to form a mark 41 on a functional face located rearward of the trailer 6. In the embodiment of FIG. 1, this functional face is the front wall 61 of the trailer 6 that faces the cab 5.

Figure 3:
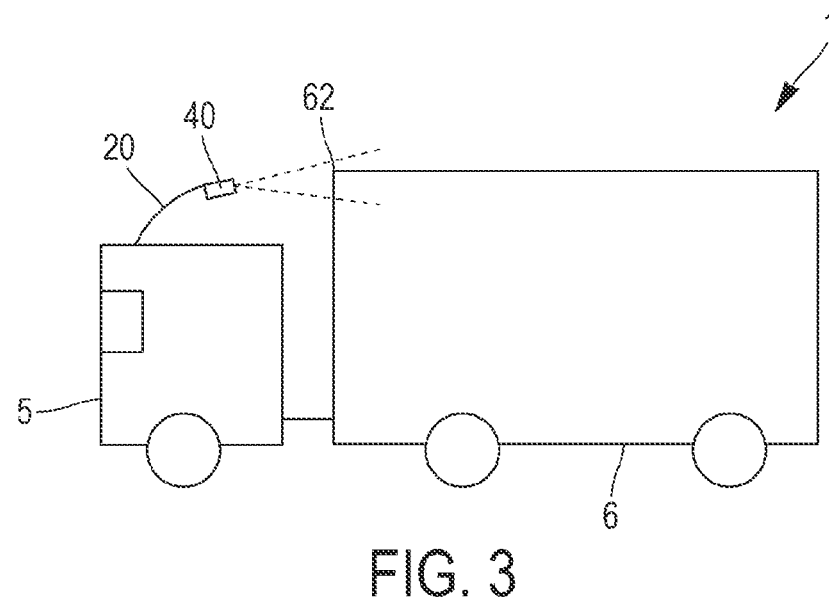
FIG. 3 is a schematic side view of the vehicle of FIG. 1 in a non-optimal position of the air deflector panel.
Figure 4:
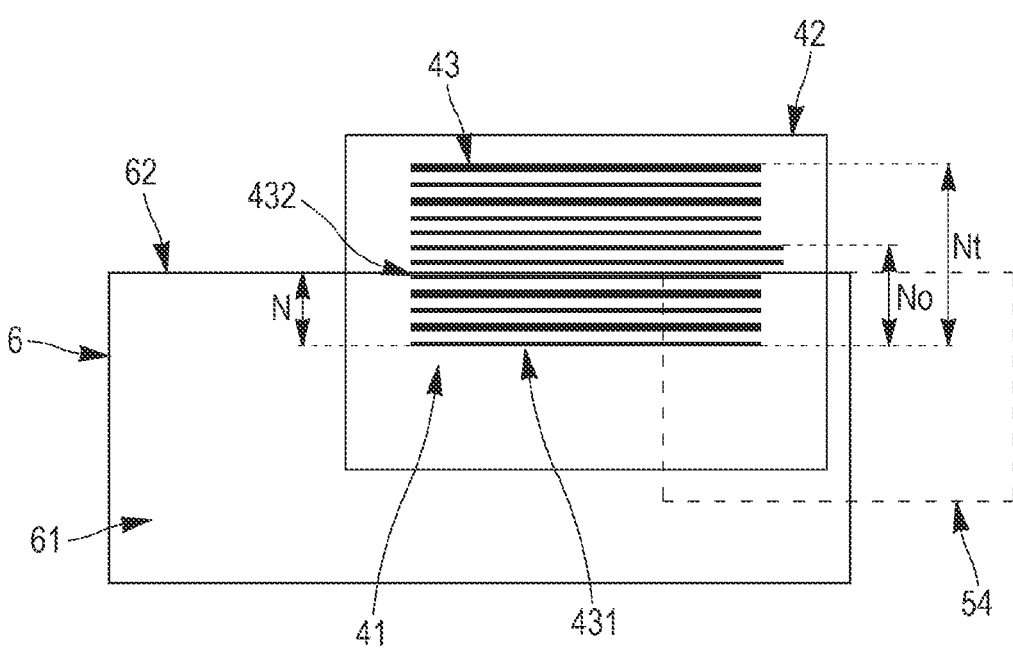
FIG. 4 shows an image projected by a lighting device of the vehicle of FIG. 1 in the specific position of the air deflector panel illustrated in FIG. 3.

Reference is now made to FIGS. 3 and 4.

According to this embodiment, the lighting device 40 includes one or several light source(s) which is/are configured to project an image 42 frontward the trailer 6, the image 42 comprising a set of Nt horizontal lines 43. The image 42 is thus similar to a bar code. The image 42 is projected at least partially on the front wall 61 of the trailer 6, which can be a reflective surface, and forms a mark 41 thereon. The mark 41 consists of a set of N horizontal lines, the number N being counted from a first line 431 positioned at the bottom of the image 42 to a last line 432 positioned just under the top edge 62 of the trailer 6. Depending on the angle of inclination a of the top air deflector panel 20, the number N of horizontal lines of the mark 41 may vary between 0 and Nt that corresponds to the total number of horizontal lines of the image 42.

The mark 41 is positioned on the front wall 61 of the trailer 6 to be at least partially detectable by the camera 51. As illustrated in FIG. 4, the captured image 54 may cover only a portion of the mark 41, said portion comprising for example a left, a central or a right part of the horizontal lines 43 of the mark 41. Therefore, the camera monitoring system 50 can count the number N of horizontal lines of the mark 41 based on the captured image 54.

This number N can thus be provided to the controller 30 to determine the current position of the top air deflector panel 20 relative to an optimal position thereof.

This optimal position is reached when the rear end 11 of the top air deflector panel 20 is positioned such that the air flow is directed to move optimally above the roof of the trailer 6. In this optimal position, the airflow is guided around the vehicle during driving, i.e., the top air deflector panel 20 redirects the air which is moving over the moving vehicle in such a way that the air does not hit the front wall 61 of the trailer 6 but instead the air is moving over the roof of the trailer 6. At the same time, the top air deflector panel 20 is not positioned too high to unnecessarily increase the air resistance.

The same effects are seen for a vehicle carrying a load having a width extending beyond the width of the cab.

This optimal position corresponds to an optimum angle of inclination a of the top air deflector panel 20. When the top air deflector panel 20 is oriented according to this optimum angle of inclination a, it leads to a specific orientation of the lighting device 40 that produces a mark 41 comprising No horizontal lines 43. This mark 41 is thus considered as a reference mark and No is considered as a reference number.

Thus, by comparing the mark 41 at least partially detected by the camera 51 with this reference mark, the controller 30 can determine the current position of the top air deflector panel 20 relative to its optimal position.

In particular, the controller 30 can compare the number N of horizontal lines of the mark 41 with the reference number No. If N<No, the controller 30 determines that the angle of inclination of the top air deflector panel 20 is greater than the optimum angle of inclination. On the contrary, if N>No, the controller 30 determines that the angle of inclination of the top air deflector panel 20 is lower than the optimum angle of inclination.

Based on said comparison, the controller 30 is adapted to control the actuator 31 to adjust the position/orientation of the top air deflector panel 20 from its current position to its optimal position.

In particular, the controller 30 is adapted to control the actuator 31 to upward the top air deflector panel 20 if the number N of horizontal lines of the mark 41 is greater than the reference number No and to downward the top air deflector panel 20 if the number N of horizontal lines of the mark 41 is lower than the reference number No.

After the position/orientation of the top air deflector panel 20 has been adjusted, the controller 30 can determine if the top air deflector panel 20 has reached its optimal position by checking that the number N of horizontal lines of the mark 41 is equal to the reference number No.

In other embodiments of the present invention, the mark 41 may alternatively consist of a set of repetitive patterns aligned along a vertical direction. The repetitive patterns may be chosen for example among a straight line, a curved line, a point, a round shape, an oval shape, a square shape and a rectangular shape.

Figure 5:
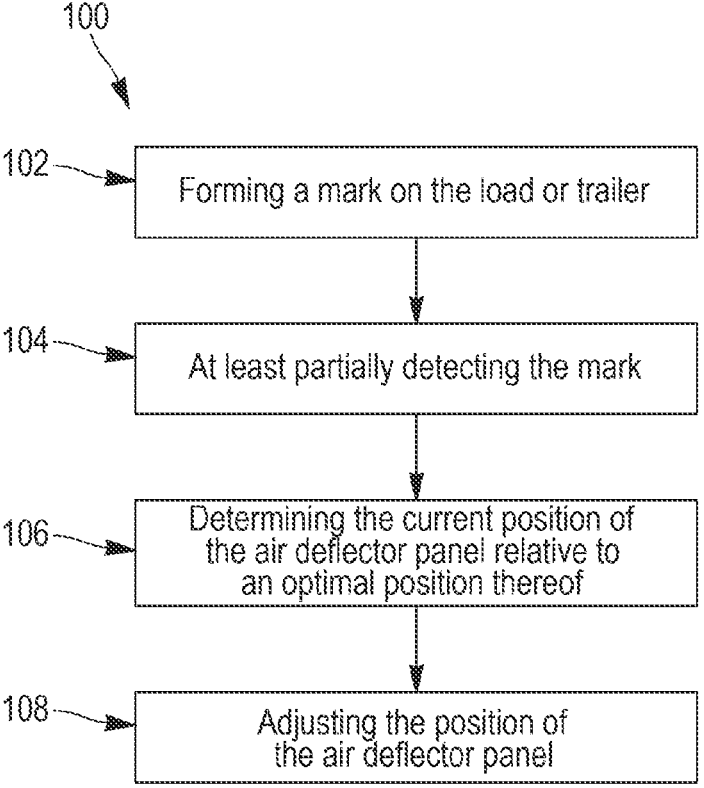
FIG. 5 is a flow chart of a method according to an embodiment of the present invention.

FIG. 5 illustrates a flow chart of a method 100 according to an embodiment of the present invention. The method 100 comprises the steps of:

forming 102 a mark 41 on the load or the trailer 6, using at least one lighting device 40 which is mounted on the top air deflector panel 20, at least partially detecting 104 the mark 41 using a camera 51 arranged on a supporting arm mounted on the cab 5, determining 106 the current position of the top air deflector panel 20 relative to an optimal position thereof by comparing the mark 41 at least partially detected by the camera 51 with a reference mark corresponding to the optimal position of the top air deflector panel 20, adjusting 108 the position of the top air deflector panel 20 from its current position to its optimal position using an actuator 31.

In one embodiment, the mark 41 consisting of a set of horizontal lines 43, the determining step 106 is based on a number N of horizontal lines 43 of which the mark 41 is formed.

In one embodiment, the determining step 106 involves a comparison between the number N of horizontal lines 43 of the mark 41 with a reference number No corresponding to the number of horizontal lines 43 of the reference mark and the adjusting 108 consists in upwarding the top air deflector panel 20 if the number N of horizontal lines 43 of the mark 41 is greater than the reference number No and downwarding the top air deflector panel 20 if the number N of horizontal lines 43 of the mark 41 is lower than the reference number No.

In one embodiment, the detecting step 104 involves a count of the horizontal lines 43 of the mark 41.

In case of no detection of the horizontal line could be representative of the tractor without trailer, the deflector will be adjusted at the bottom position.

In one embodiment, the camera 51 is adapted to provide a class II or IV field of vision as defined in the Regulation UN ECE no. 46.

In one embodiment, the top air deflector panel 20 has a front edge 10 pivotally linked to a roof 8 of the cab 5 and a rear edge 11.

In one embodiment, the at least one lighting device 40 is mounted near the rear edge 11 of the top air deflector panel 20.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
   a chassis which has a longitudinal axis and which is supported by wheels;
   a cab mounted on the chassis;
   a load or a trailer detachably attached to the chassis;
   an air deflector panel, which is movably attached to the cab;
   an actuator configured to adjust the position of the air deflector panel relative to the cab;
   a camera monitoring system, which includes a camera arranged on a supporting arm mounted on the cab, to provide a captured image of an area located rearward of the cab;
   at least one lighting device comprising a housing which receives a light source that emits a beam rearward through a glass, the lighting device being mounted on the air deflector panel and configured to form a mark on the load or the trailer, the mark comprising a set of horizontal lines projected on a frontward face of the load or trailer, the mark being positioned to be at least partially detectable by the camera and the mark depending on a current position of the air deflector panel; and
   a controller configured to determine the current position of the air deflector panel relative to an optimal position thereof by comparing the mark at least partially detected by the camera with a reference mark corresponding to the optimal position of the air deflector panel and configured to control the actuator to adjust the position of the air deflector panel from its current position to its optimal position.

2. The vehicle of claim 1, wherein the controller is configured to determine the current position of the air deflector panel relative to its optimal position based on a number of horizontal lines of which the mark is formed.

3. The vehicle of claim 2, wherein the controller is configured to compare the number of horizontal lines of the mark with a reference number corresponding to the number of horizontal lines of the reference mark and to control the actuator based on the comparison.

4. The vehicle of claim 3, wherein the controller is configured to control the actuator to upward the air deflector panel if the number of horizontal lines of the mark is greater than the reference number and to downward the air deflector panel if the number of horizontal lines of the mark is lower than the reference number.

5. The vehicle of claim 2, wherein the camera monitoring system is adapted to count the horizontal lines in the captured image.

6. The vehicle of claim 1, wherein the camera is adapted to provide a class II or IV field of vision as defined in the Regulation UN ECE no. 46.

7. The vehicle of claim 1, wherein the air deflector panel has a front edge pivotally linked to a roof of the cab and a rear edge.

8. The vehicle of claim 7, wherein the at least one lighting device is mounted at a rear portion of the air deflector panel.

9. A method for controlling the position of an air deflector panel movably attached to a cab of a vehicle, the vehicle carrying a load or towing a trailer, the method comprising the steps of:
   forming a mark on the load or the trailer, the mark comprising a set of horizontal lines projected on a frontward face of the load or trailer, using at least one lighting device comprising a housing which receives a light source that emits a beam rearward through a glass, the at least one light device being mounted on the air deflector panel;
   at least partially detecting the mark using a camera arranged on a supporting arm mounted on the cab;
   determining a current position of the air deflector panel relative to an optimal position thereof by comparing the mark at least partially detected by the camera with a reference mark corresponding to the optimal position of the air deflector panel; and
   adjusting the position of the air deflector panel from its current position to its optimal position using an actuator.

10. The method of claim 9, wherein the determination of the current position of the air deflector panel relative to its optimal position is based on a number of horizontal lines of which the mark is formed.

11. The method of claim 10, wherein the determination of the current position of the air deflector panel relative to its optimal position involves a comparison between the number of horizontal lines of the mark with a reference number corresponding to the number of horizontal lines of the reference mark and the step of adjusting the position of the air deflector panel consists in upwarding the air deflector panel if the number of horizontal lines of the mark is greater than the reference number and downwarding the air deflector panel if the number of horizontal lines of the mark is lower than the reference number.

12. The method of claim 10, wherein the step of detecting the mark involves a count of the horizontal lines of the mark.

13. The method of claim 9, wherein the camera is adapted to provide a class II or IV field of vision as defined in the Regulation UN ECE no. 46.

14. The method of claim 9, wherein the air deflector panel has a front edge pivotally linked to a roof of the cab and a rear edge.

15. The method of claim 14, wherein the at least one lighting device is mounted at a rear portion of the air deflector panel.

\* \* \* \* \*